United States Patent [19]

Speroni

[11] Patent Number: 4,709,464

[45] Date of Patent: Dec. 1, 1987

[54] INDEXING MECHANISM FOR COMPUTER CONTROLLED MILLING MACHINES

[76] Inventor: Richard J. Speroni, 29256 Union City Blvd., Union City, Calif. 94587

[21] Appl. No.: 836,707

[22] Filed: Mar. 6, 1986

[51] Int. Cl.⁴ .................. B23Q 3/157; B23B 31/10
[52] U.S. Cl. ..................................... 29/568; 10/134; 10/141 H; 408/239 R
[58] Field of Search ............ 409/144, 230, 231, 232, 409/233, 234; 408/20, 239 R; 414/736; 211/1, 5; 901/41; 29/568, 26 A, 26 R; 10/134, 141 H

[56] References Cited

U.S. PATENT DOCUMENTS

| | | | |
|---|---|---|---|
| 3,717,892 | 2/1973 | Johnson | 10/141 H |
| 3,962,777 | 6/1976 | Stoilov | 29/568 |
| 4,566,829 | 1/1986 | Johnson | 10/141 H |

FOREIGN PATENT DOCUMENTS

| | | | |
|---|---|---|---|
| 16079 | 2/1977 | Japan | 29/568 |
| 866627 | 4/1961 | United Kingdom | 29/26 R |
| 1526546 | 9/1978 | United Kingdom | 408/239 R |

Primary Examiner—Z. R. Bilinsky
Attorney, Agent, or Firm—Linval B. Castle

[57] ABSTRACT

Apparatus for adapting a high speed, drill press type tapping head for use with a CNC vertical milling machine and specifically to a three-piece apparatus that will maintain proper rotation-free alignment of the tapping head housing in both the movable automatic tool rack and in the spindle of the mill. A forked flange secured to the tapping head housing engages a vertically depending shaft attached to a vertically movable, non-rotating part of the mill to prevent rotation of the housing when the tap is rotated by the mill. The opposite side of the tapping head housing supports a short horizontal shaft that engages depending forks on a member attached to the assigned location of the tapping head in the movable tool rack.

2 Claims, 6 Drawing Figures

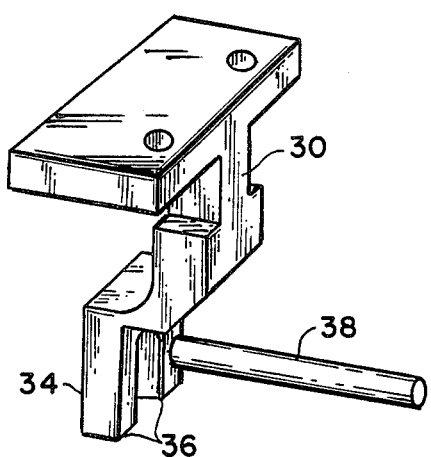
FIG. 5
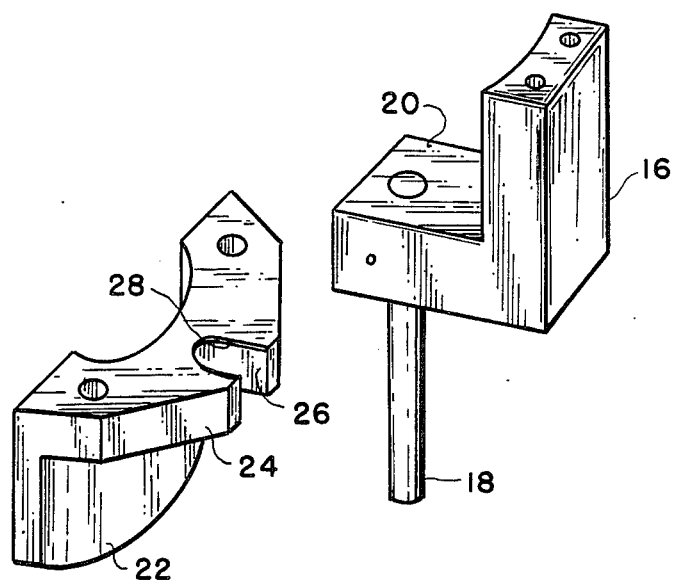
FIG. 4
FIG. 3

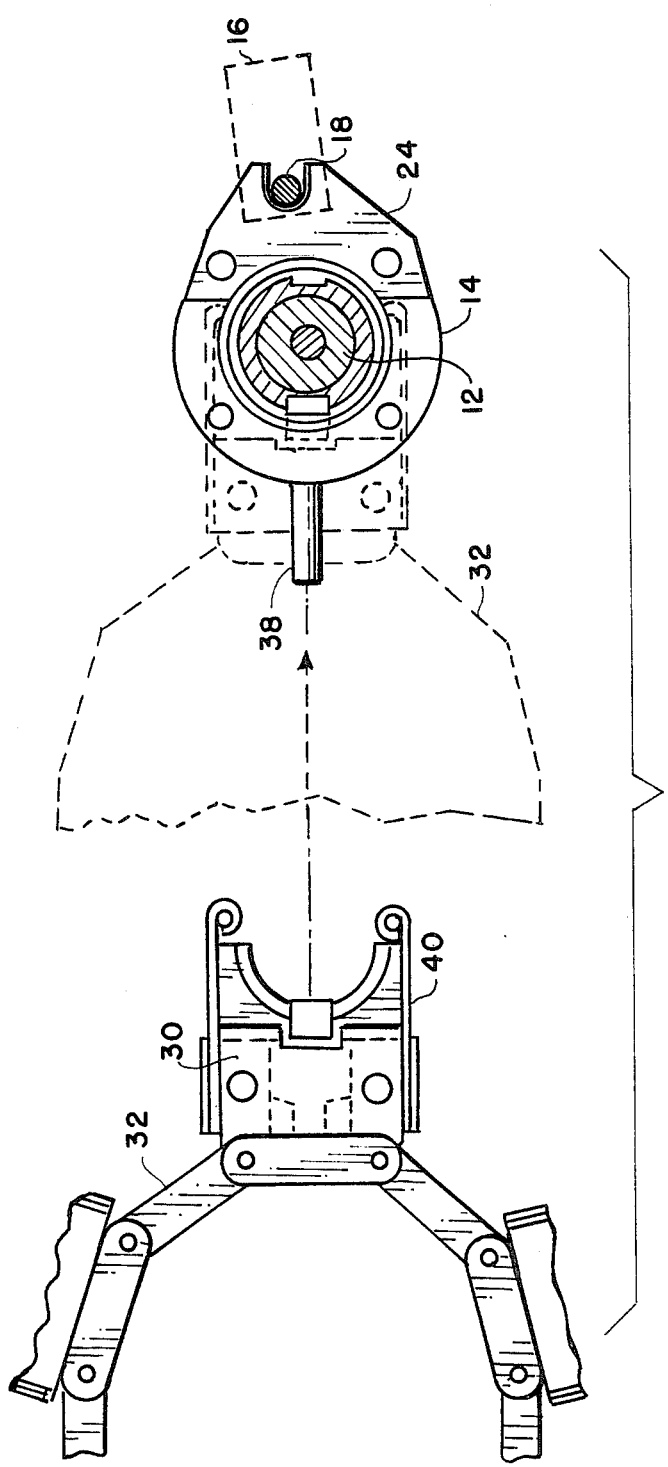

INDEXING MECHANISM FOR COMPUTER CONTROLLED MILLING MACHINES

BRIEF SUMMARY OF THE INVENTION

This invention relates generally to computer controlled milling machines or computer numerical control (CNC) vertical milling machines, and in particular to an indexing attachment enabling the use of high speed tapping heads with such machines.

Modern production types of milling machines are computer controlled and are programmed to perform certain series of precision functions, such as to first move the table holding a workpiece to a preprogrammed X and Y location, move a movable tool rack with certain tool holder to a position under the mill spindle, remove a designated tool holder and its colleted milling cutter, drill, broach, reamer or tap from its position in the movable tool rack, insert the tool holder into the tapered rotational spindle of the mill, lower the mill head a predetermined distance while rotating the spindle, raising the mill head to withdraw the tool holder, removing and replacing the tool holder in its proper rack in the movable tool rack, and then moving the workpiece table to the next designated X-Y position. The entire milling process, if properly programmed into the milling machine computer, is conducted without any attendant except when it becomes necessary to replace the completed workpiece.

A problem exists when it becomes necessary to use a tapping head. Tapping heads designed for CNC vertical milling machine use are not automatically reversible and to withdraw a thread tap from the workpiece necessitates a rotational reversal of the milling machine spindle. This can be readily done with computer control, however such reversal results in loss in time, high electrical switching surges that can affect the operation of other electrical machinery and electronic instruments, and also may cause damage to the milling maching spindle bearings and the drive motor. An additional disadvantage of this type of tapping head is that heavy rotational loads, such as those caused by dull taps, will cause the tapping head to slip or stop altogether.

Long before the introduction of CNC machines, tapping heads were developed for use in chucks on the rotatable spindles of conventional drill presses. Termed as high speed tapping heads, these heads both reduce the rotational speed of their chucks to a desirable tapping speed and, as the continuously rotating drill press spindle is raised, also automatically counterrotate to back out its tap from the workpiece and are ready for the next tapping operation. To prevent any rotation of the tapping head housing with the rotational spindle, a horizontal tie rod connected to the tapping head housing extends out to contact the side of the stationary vertical supporting shaft of the drill press. Much faster and more reliable tapping operations on CNC milling machines can be realized if it were possible to adapt these high speed drill press type of tapping heads for use on CNC machines.

The object of this invention is therefore to provide an indexing system that will accurately position a drill press type of tapping head in the spindle of a CNC milling machine, lock the tapping head housing against rotation in either direction, and will accurately replace the tapping head, properly oriented, in its designated slot in the movable tool holder.

Briefly described the invention is for apparatus enabling the use of a drill press type of tapping head in a CNC vertical milling machine and includes three separate but cooperating components. A first component is a bifurcated collar that is attached to the tapping head and has a horizontally extending fork which, when the head is inserted into the tapered chuck in a milling machine spindle, prevents rotation of the tapping head by engaging a second component, an attachment to a stationary member near the milling machine spindle chuck and having a vertically depending shaft. The stationary depending shaft engaging the tapping head fork thus prevents rotation of the tapping head. The third component is attached to the movable tool rack at the tapping head's assigned position and comprises a member with a vertically depending fork for engaging a short horizontal tie rod attached to the tapping head. Thus, the tapping head is aligned in a fixed position by the tool rack fork and tie rod and, when moved into position beneath the milling machine spindle chuck, will be locked against rotation by the mill's depending shaft engaging the tapping head fork.

BRIEF DESCRIPTION OF THE DRAWINGS

In the drawings which illustrate the preferred embodiment of the invention:

FIG. 3 is a perspective view illustrating the milling machine indexing component of FIG. 1;

FIG. 4 is a perspective view illustrating the tapping head indexing component of FIG. 1;

FIG. 5 is a perspective view illustrating the tool rack indexing component of FIG. 1; and FIG. 6 is plan view taken along the lines 6—6 of FIGS. 1 and 2 and illustrates the movable tool rack and the tapping head indexed in position in the milling machine spindle;

DETAILED DESCRIPTION OF THE INVENTION

As previously briefly described, the invention is for three mechanical components which will enable the use of a drill press type of tapping head normally held in a specific position in a movable tool rack with a computer numerical control (CNC) vertical milling machine.

Figure 1:
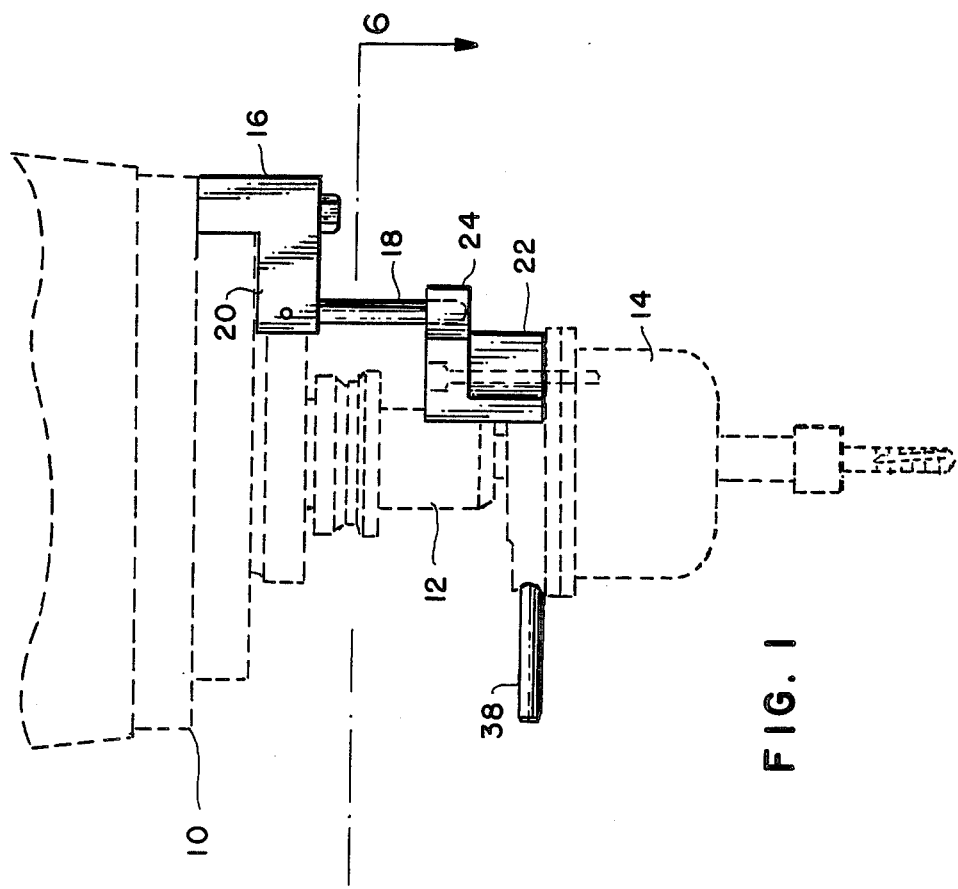
FIG. 1 is a side elevational view illustrating the milling machine indexing component attached to the head of a vertical milling machine shown by dashed lines, and the tapping head indexing component attached to a tapping head shown by dashed lines.

Illustrated in dashed lines in FIG. 1 is an elevational view of the stationary head 10 of such a CNC vertical milling machine with a depending rotatable spindle 12 with a suitable tapered chuck for securing a rotatable cutting tool or a tapping head 14 also illustrated by dashed lines. The apparatus illustrated by dashed lines form no part of the invention but are presented to demonstrate the utility and operation of the invention.

Attached by machine screws to the vertically movable, nonrotating head 10 of the milling machine is a milling machine indexing component 16 as shown in FIG. 1 and best illustrated in FIG. 3. The milling machine indexing component 16 is generally "L" shaped and has a vertically depending shaft 18 positioned in the horizontal base portion 20 and as closely as practical to the outer edge of the base portion.

Bolted to the housing of a drill press type of tapping head, such as the type manufactured by Procunier Safety Chuck Co. of Lakeland, Fla., is a tapping head indexing component 22, shown in FIG. 1 and illustrated in detail in the perspective view of FIG. 4. This component has a horizontally extending flange 24 that has a vertical slot 26 at the periphery for receiving the vertical shaft 18 depending from the milling maching indexing component 16. It will be noted that the upper edge of the slot 26 is chamfered 28 to assist in guiding the depending shaft 18 into the slot 26 when the milling machine head is lowered to insert the tapping head into the spindle chuck. With the tapping head indexing component 22 thus coupled at a predetermined fixed position to the non-rotating milling head indexing component 16, a threading tap chucked in the drill press type of tapping head will be rotated in a first direction by a downward force of the milling machine spindle and will counterrotate in a second direction by upward force without changing the rotational direction or speed of the spindle.

The movable tool rack on a typical CNC vertical milling machine generally includes a horizontal chain movable by powered sprockets rotatable on a vertical axis. The chain position is controlled by computer and, at a predetermined programmed time, will horizontally move to a position under the milling machine spindle which is then lowered so that the tool rack can grasp the tool to remove it from the spindle chuck and to its proper storage position in the movable tool rack. The tool rack chain then selects the next tool in the operation and positions it under the spindle so that the vertically movable milling machine head may be lowered to receive it in its tapered chuck.

As described above, a drill press type of tapping head must be positioned in the spindle chuck at a particular position so that the indexing components can lock it's housing against rotation. To assure that the tapping head will arrive at the proper rotational position under the spindle, it is similarly necessary that the tapping head is always removed from the movable tool rack in a proper rotation position. Thus, it is necessary to provide an indexing mechanism between the tool rack and the tapping head.

Figure 2:
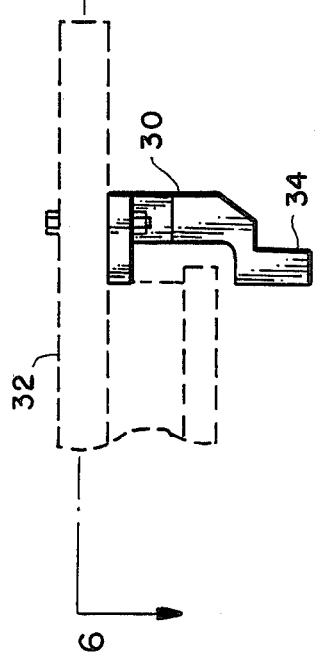
FIG. 2 is a side elevational view of the tool rack indexing component attached at the tapping head location of a movable tool rack shown by dashed lines.

FIG. 2 is an elevational view of a tool rack indexing component 30 bolted to a tool rack 32 shown in dashed lines. A detailed perspective view of the component 30 is illustrated in FIG. 5 and shows a member having a vertical section 34 with depending forks 36 for engaging a horizontal tie rod 38 connected to the housing of the tapping head 14 to thereby lock the tapping head against rotation within the tool rack 32. Thus, with proper alignment of the tie rod 38 and the tapping head indexing component 22 on the surface of the tapping head, the tool rack will always position the tapping head under the milling machine spindle in the proper position so that, upon lowering of the milling head and spindle, the tapping head will engage the spindle with the depending shaft 18 in the milling head component 16 engaging the slot 26 in the tapping head component 22.

FIG. 6 is a plan view taken along the lines 6—6 of FIG. 1 and illustrates the operation of the invention. As shown in the drawing on the left in FIG. 6, the movable chain of the movable tool rack 32 supports several holders at various positions for various cutting tools, such as the tool holder 40 for the storage of the drill press type of tapping head 14. As described above, the tool holder 40 has attached thereto the tool rack indexing component 30 of FIG. 5. In FIG. 6, the tool rack 32 including the resilient tool holder 40 and the indexing component 30 is shown as having been moved toward the right and at a location at which the tool holder 40 is positioned for either inserting or receiving the tapping head 14 into or from the milling machine spindle 12. It will be noted that the housing of the tapping head 14 is locked against rotation with the spindle by the engagement of the tapping head indexing component slot 26 with the vertical depending shaft 18 of the milling machine indexing component 16. In this position, the tie rod 38 remains aligned with the forks 36 on the tool rack component 30. If the tapping head is being inserted into the chuck of the milling machine spindle, the vertically movable milling spindle is lowered to receive the tapping head; if being removed, the spindle is lowered to engage the tool rack tool holder 40 and the tapping head is forced out of the spindle, usually by pneumatic force or mechanically, depending upon the design of the particular milling machine. Whenever the tapping head is attached to the resilient tool holder 40, the short tie rod 38, which may be a shortened tie rod normally supplied with the tapping head for use with drill presses, remains inserted between the forks 36 of the tool rack component 30 of FIG. 5. Therefore, strict non-rotational alignment of the tapping head is assured when it is mounted in the tool rack and when chucked in the milling machine spindle so that, when in use, a slight upward force by the spindle will cause rotational reversal of the tapping head chuck and a backing out of the tap.

I claim:

1. Indexing apparatus enabling the use of a high speed automatic reversing tapping head having a fixed horizontal tie rod with a numerical control vertical milling maching having an associated movable tool rack with a plurality of preassigned tool storage positions, said indexing apparatus providing alignment for the automatic insertion and removal of cutting tools in the movable tool rack and in the rotatable spindle of the milling machine, said apparatus comprising:

a first member attached to a non-rotating, vertically movable location on the milling machine, said first member having secured thereto a vertical dependent shaft positioned adjacent the rotatable spindle of said machine;

a second membr attached to the housing of the high speed tapping head, said second member including coupling means for engaging said vertical dependent shaft to thereby lock the housing of said tapping head against rotation; and a third member attached to the movable tool rack at the assigned storage position of said tapping head, said third member having a tool holder engagable with said tapping head housing and a dependent fork for engaging the tapping head tie rod for preventing rotation of said housing upon receipt of said tapping head by said tool rack.

2. The indexing apparatus claimed in claim 1 wherein the coupling means in said second member includes a horizontal flange having a slot extending toward and engagable with said vertical dependent shaft on said first member.

* * * * *